US010915760B1

(12) United States Patent
Lee

(10) Patent No.: US 10,915,760 B1
(45) Date of Patent: Feb. 9, 2021

(54) HUMAN DETECTION USING OCCUPANCY GRID MAPS

(71) Applicant: ObjectVideo Labs, LLC, Tysons, VA (US)

(72) Inventor: SungChun Lee, Tysons, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 275 days.

(21) Appl. No.: 16/109,285

(22) Filed: Aug. 22, 2018

Related U.S. Application Data

(60) Provisional application No. 62/548,563, filed on Aug. 22, 2017.

(51) Int. Cl.
*G06K 9/00* (2006.01)
*G06T 7/00* (2017.01)

(52) U.S. Cl.
CPC ............ *G06K 9/00778* (2013.01); *G06T 7/97* (2017.01); *G06T 2207/20081* (2013.01); *G06T 2207/20084* (2013.01); *G06T 2215/16* (2013.01)

(58) Field of Classification Search
CPC ... G06T 7/97; G06K 9/00771; G06K 9/00778
See application file for complete search history.

(56) References Cited

U.S. PATENT DOCUMENTS

| 2005/0094849 | A1 | 5/2005 | Sung et al. |
| 2007/0237387 | A1 | 10/2007 | Avidan et al. |
| 2010/0014781 | A1* | 1/2010 | Liu ...................... H04N 13/261 382/285 |
| 2016/0295196 | A1* | 10/2016 | Finn .......................... B66B 3/02 |
| 2018/0089888 | A1* | 3/2018 | Ondruska ................. G06T 7/55 |
| 2019/0130215 | A1* | 5/2019 | Kaestle ............. G06K 9/00771 |

* cited by examiner

*Primary Examiner* — Myron Wyche
(74) *Attorney, Agent, or Firm* — Fish & Richardson P.C.

(57) ABSTRACT

Methods, systems, and apparatus, including computer programs encoded on a computer storage medium, for detecting humans in images using occupancy grid maps. The methods, systems, and apparatus include actions of obtaining an image of a scene without people, generating a reference occupancy grid from the image, generating pairs of training images with humans rendered and corresponding training occupancy grids based on the occupancy grid and the image, training a scene-specific human detector with the pairs of training images with humans rendered and corresponding training occupancy grids, generating a sample occupancy grid from a sample image using the scene-specific human detector, and augmenting the sample image using the sample occupancy grid.

20 Claims, 2 Drawing Sheets

HUMAN DETECTION USING OCCUPANCY GRID MAPS

CROSS REFERENCE TO RELATED APPLICATIONS

This application claims benefit of U.S. Provisional Application No. 62/548,563, filed on Aug. 22, 2017, titled "HUMAN DETECTION USING OCCUPANCY GRID MAPS," which is incorporated by reference in its entirety.

TECHNICAL FIELD

This disclosure application relates generally to monitoring systems, and more particularly, to detecting humans.

BACKGROUND

Detection of humans in images may be used in various applications, such as visual surveillance, smart rooms, and security systems. Video based on human detection systems may rely on foreground blob extraction on images or identifying visible human shapes visible in images.

SUMMARY

Techniques are described for detecting humans in images using occupancy grids maps.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements.

DETAILED DESCRIPTION

Techniques are described for detecting humans in images using occupancy grid maps. Robust detection of humans in images may be important for many applications such as visual surveillance, smart rooms, and security systems. Single video human detection systems may rely on foreground blob extraction or identifying large parts of human shapes visible in images. However, these techniques may be hard to apply to images of a crowded environment. There are likely to be many objects present, which may partially (or totally) occlude each other. For example, four people may be standing close to each other so that at least a large portion of at least one person is not visible in an image. To better detect humans in images, a system may use an occupancy grid map based human detection method by applying a deep learning framework which is trained using images with rendered human characters. The detection may be trained for a specific scene of a particular camera so may better detect humans in images from the particular camera.

Figure 1:
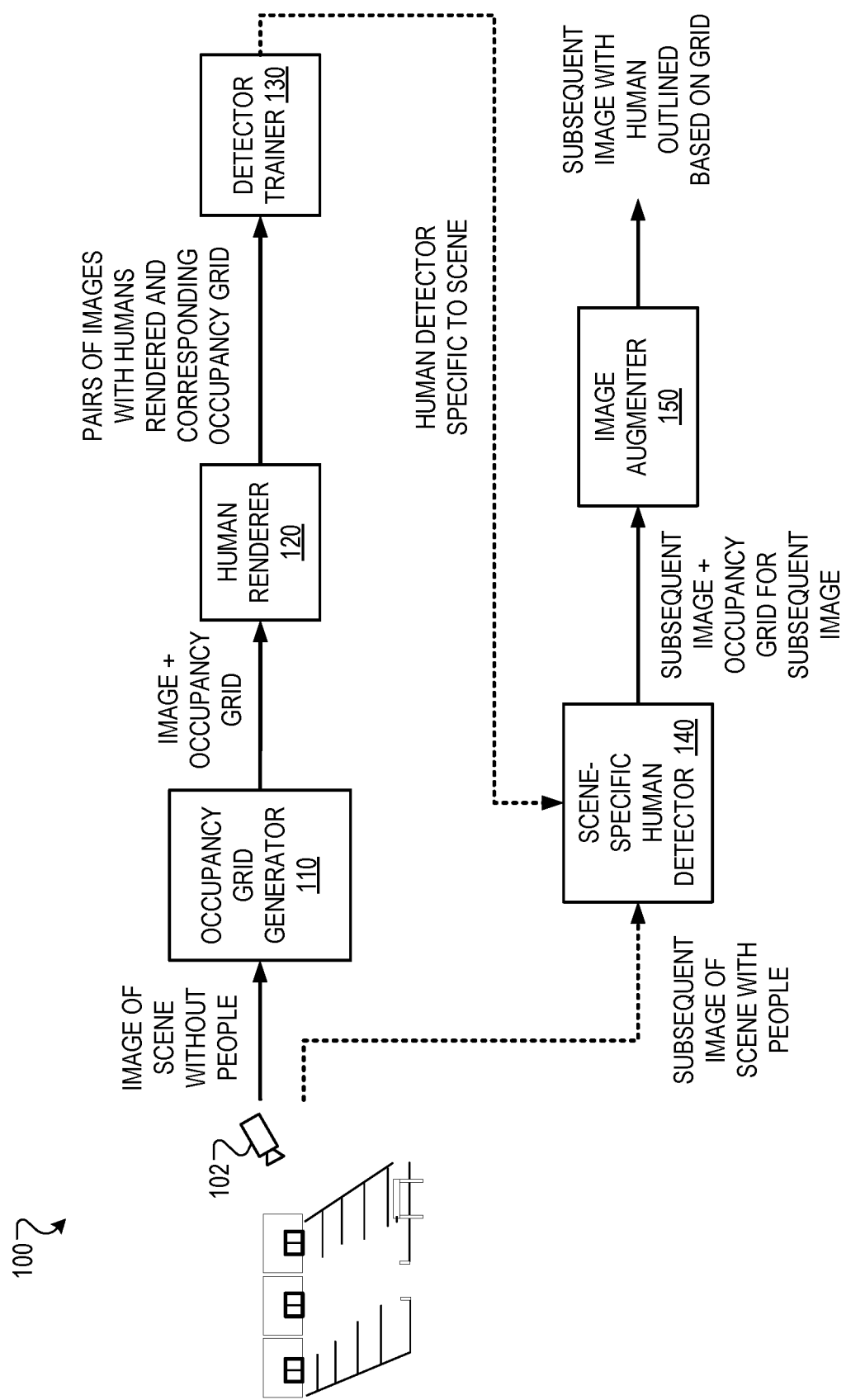
FIG. 1 illustrates an example block diagram of detecting humans in images using occupancy grid maps.

FIG. 1 illustrates an example block diagram of system 100 for detecting humans in images using occupancy grid maps, also referred to as occupancy grids. The system 100 includes an occupancy grid generator 110, a human renderer 120, a detector trainer 130, a scene-specific human detector 140, and an image augmenter 150. In some implementations, the occupancy grid generator 110, a human renderer 120, a detector trainer 130, a scene-specific human detector 140, and an image augmenter 150 may be part of a server that receives images captured by a camera 102 and provides augmented images. For example, the camera 102 may provide a stream of images, e.g., a video, to a server that augments the images by adding outlines around humans detected in the images and sends the augmented images to a device for display to a security guard on a screen. Accordingly, the system 100 may enable someone to quickly identify humans within images. The system 100 may be implemented on one or more computing devices that include software modules that correspond to the occupancy grid generator 110, the human renderer 120, the detector trainer 130, the scene-specific human detector 140, and the image augmenter 150.

The occupancy grid generator 110 may obtain an image captured by a camera 102 of a scene without people and generate an occupancy grid. For example, the occupancy grid generator 110 may obtain an image of a parking lot of a shopping center when there are no people in the parking lot and generate a grid that is thirty-two blocks by thirty-two blocks.

The occupancy grid may be a grid that represents areas shown within the image from an overhead view and may indicate what portions of the occupancy grid correspond to what areas in the image and for each area, whether a human is in the area. For example, the occupancy grid generated from an image of a parking lot may represent a total of one thousand twenty four two foot by two foot non-overlapping areas of the parking lot shown in the image and indicate where each of the non-overlapping areas appear in the image and also that no human is in each area. A scene may refer to a view from the camera 102. For example, a scene may be images from a particular camera viewing a parking lot. The occupancy grid is generally described herein as being made up of multiple squares, which represent one person's occupancy space.

The occupancy grid generator 110 may generate the occupancy grid by identifying ground in the image and then mapping a grid onto the ground identified in the image. For example, the occupancy grid generator 110 may determine a perspective of a camera relative to ground shown in the image and then map the grid to the ground where each square in a grid covers the same amount of ground. In some implementations, the occupancy grid generator 110 may take into account ground that is not level. For example, the occupancy grid generator 110 may identify ground in the image and then map a grid to the identified ground as if the grid were projected from directly above onto the ground.

The human renderer 120 may obtain the image and the occupancy grid and generate multiple pairs of images with humans rendered and corresponding occupancy grids. For example, the human render 120 may obtain the image of the empty parking lot and the corresponding occupancy grid and then generate a first pair that includes (i) an image of the parking lot with a single 3-D human character rendered onto an area in the image that corresponds to the upper left corner square of a corresponding occupancy grid and (ii) the corresponding occupancy grid that indicates in the upper left corner square that a human is present, where no other square of the occupancy grid indicates a human is present. The human render may generate these pairs as training data because obtaining sufficient annotated data for training a detector using only images of a scene captured with actual humans may take a long time, or be very resource intensive because images may need to be annotated manually to indicate where humans are located in the images.

In the example, the human render 120 may then generate a second pair that includes (i) an image of the parking lot with a first 3-D human character rendered onto an area in the image that corresponds to the upper left corner square of a corresponding occupancy grid and a second 3-D human character rendered onto an area in the image that corresponds to an area adjacent to the area corresponding to the upper left corner square of the occupancy square, where the second 3-D human character is rendered to overlap the first 3-D human and (ii) the corresponding occupancy grid that indicates in the upper left corner square that a human is present and in the square adjacent to the upper left corner square that a human is present.

The human renderer 120 may generate pairs until a pair is generated for each possible combination of occupancy within the occupancy grid. For example, for a two by two occupancy square, the human renderer 120 may generate four pairs where each pair is for a single square having a person, six pairs where two squares have a person, four pairs where three squares have a person, and a single pair where all four squares have a person, for a total of fifteen pairs.

The detector trainer 130 may obtain the pairs of images with humans rendered and the corresponding occupancy grid and train a scene-specific human detector 140 using the pairs of images. For example, the detector trainer 130 may obtain a thousand different pairs generated by the human renderer 120 and then use the thousand different pairs as training data to train the scene-specific human detector 140, where the images with added rendered human characters are treated as inputs and the corresponding occupancy grids are treated as expected outputs.

In some implementations, the detector trainer 130 may train the scene-specific human detector 140 by training a Long Short-Term Memory (LSTM) network. For example, the detector trainer 130 may provide the images with rendered human characters as inputs and the corresponding occupancy grids to the LSTM network so that the LSTM network is trained to output one of the occupancy grids in response to receiving a corresponding image with rendered human characters as input.

The scene-specific human detector 140 may obtain a subsequent image of a scene with people captured by the camera 102 and then generate an occupancy grid from the subsequent image. For example, the scene-specific human detector 140 may obtain an image of a scene with twenty people captured by the camera 102 where various portions of people are overlapped by other people and then generate an occupancy grid that indicates whether a human is detected in each area of the image that corresponds to a square in the occupancy grid. The scene-specific human detector 140 may be considered scene-specific as the scene-specific human detector 140 may be trained specifically on images of a particular scene. Accordingly, the scene-specific human detector 140 may accurately detect humans within images of the scene but not accurately detect humans within images of another scene.

The image augmenter 150 may obtain the subsequent image and the occupancy grid for the subsequent image and augment the subsequent image based on the occupancy grid. For example, the image augmenter 150 may obtain an image of a parking lot with twenty people and an occupancy grid that includes squares that correspond to the areas in the image with the twenty people indicating a human is present and squares that correspond to the other areas in the image indicating a human is not present. In the example, the image augmenter 150 may then augment the image of the parking lot with twenty people by adding a human shaped outline with a bottom at each area corresponding to the twenty squares in the grid that indicate a human is present. In some implementations, the image augmenter 150 may augment the subsequent image in other ways. For example, the image augmenter 150 may add an arrow pointing to the area corresponding to the grid or show a grid on the subsequent image and show a different color for each square of the grid that a human is detected.

In some implementations, the system 100 may also detect a type of human. For example, the system 100 may detect whether a human is an adult or a child, how tall a human is, or some other type. The human renderer 120 may use different 3-D human characters for each of the types and the corresponding occupancy grid may indicate the type of 3-D human character rendered for that square. For example, the human renderer 120 may have a 3-D human character with a human that is three feet tall, another 3-D human character with a human that is four feet tall, another 3-D human character with a human that is five feet tall, etc. The human renderer 120 may similarly generate pairs until all various combinations of the different types of 3-D human characters are rendered. The scene-specific human detector 140 may then be trained to also detect the type of 3-D human character that is most visually similar to the human that appears in a subsequent image, the occupancy grid generated by the scene-specific human detector 140 may indicate the type of humans detected, and the image augmenter 150 may augment the subsequent image to indicate the type of humans detected.

In some implementations, the detector trainer 130 may also use a convolutional neural network (CNN) to generate image feature descriptors. The image encoded by the pre-trained CNN may then be used as training input for the LSTM network and the corresponding occupancy grid for the image used as training output for the LSTM network. The scene-specific human detector 140 may then use the CNN network on a subsequent image and then provide the encoded image from the CNN network as input to a trained LSTM network to obtain an occupancy map corresponding to the subsequent image.

Figure 2:
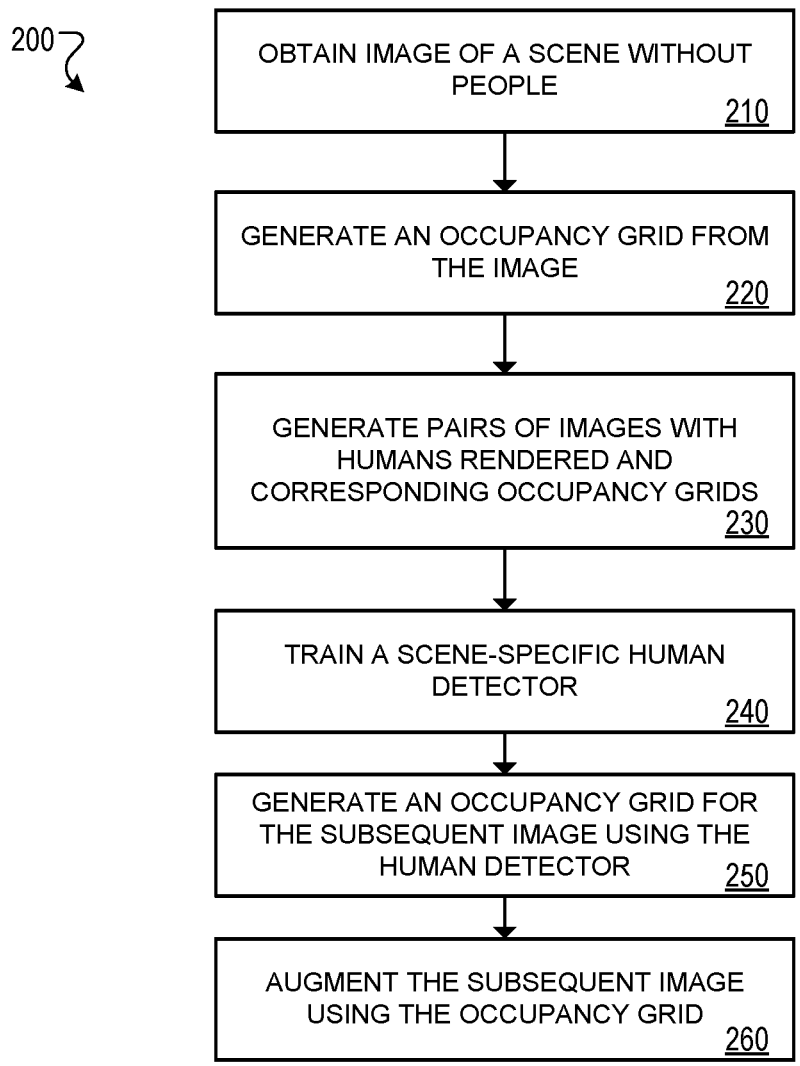
FIG. 2 is a flow diagram of an example process for detecting humans in images using occupancy grid maps.

FIG. 2 is a flow diagram of an example process 200 for detecting humans in images using occupancy grid maps. Process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes obtaining an image of a scene without people (210). For example, the occupancy grid generator 110 may obtain an image captured by the camera 102 of a parking lot when no people are in the parking lot. In some implementations, a human may verify that no people are in the image. For example, the human may select the image as an image of the scene without people.

The process 200 includes generating an occupancy grid from the image (220). For example, the occupancy grid generator 110 may determine an occupancy grid that indicates which areas of the image correspond to which squares in the occupancy grid and further indicates that no human is detected in any area corresponding to any square. The occupancy grid generated from the image of the scene without people may also be referred to as a reference occupancy grid and the image of the scene that is without people may referred to as a reference image.

In some implementations, generating a reference occupancy grid from the image may include generating an overhead grid representation of the scene in the image, where each square within the overhead grid representation corresponds to a different geographical area in the scene. For example, the occupancy grid generator 110 may determine a geographical shape that is rectangular in the scene in the image and then generate an overhead representation of the geographical shape.

In some implementations, generating a reference occupancy grid from the image includes identifying ground in the image and mapping a geometric grid onto the ground identified in the image. For example, the occupancy grid generator 110 may determine a ground plane in the image and then map a geometric grid onto the ground so that each square in the grid covers a same 2-D area of the ground plane.

The process 200 includes generating pairs of images with humans rendered and corresponding occupancy grids (230). For example, the human renderer 120 may generate pairs of images and corresponding occupancy grids, where the images have humans rendered in the various areas of the image and the paired occupancy grids indicate that humans are in the area of the image in which humans are rendered. The images with humans rendered may also be referred to as training images and the corresponding occupancy grids may also be referred to as training occupancy grids.

In some implementations, generating pairs of images with humans rendered and corresponding occupancy grids includes generating a first training occupancy grid that indicates humans present in particular areas in a first training image and generating the first training image by rendering graphical representations of humans in locations in the first training image that correspond to the particular areas indicated by the training occupancy grid as having humans present. For example, the human renderer 120 may generate a training occupancy grid that indicates that an upper left most corner is occupied by a human and render onto the reference image a 3-D model of a human onto an area of the reference image that corresponds to the upper left most corner. In another example, the human renderer 120 may generate a training occupancy grid that indicates that a bottom left most corner is occupied by a human and render onto the reference image a 3-D model of a human onto an area of the reference image that corresponds to the bottom left most corner, and as the bottom left most corner may correspond to an area of the image that is closer to the viewpoint of the camera that captured the reference image than the area of the image that corresponds to the upper left most corner, the 3-D model of the human rendered on the reference image for the bottom left most corner may be larger than the 3-D model of the human rendered on the reference image for the upper left most corner.

In some implementations, generating pairs of training images with humans rendered and corresponding training occupancy grids based on the occupancy grid and the image includes generating a first training occupancy grid that indicates different types of humans present in particular areas in a first training image and generating the first training image by rendering graphical representations of humans in locations in the first training image that correspond to the particular areas indicated by the first training occupancy grid as having humans present, where the graphical representations of humans rendered are visually different based on the type of human indicated by the first training occupancy grid. For example, a first training occupancy grid may indicate an adult in one square and a child in another square, and human renderer 120 may accordingly render a 3-D representation stick figure for the adult onto the reference image and a smaller 3-D representation stick figure for the child onto the reference image.

The process 200 includes training a scene-specific human detector (240). For example, the detector trainer 130 may use the pairs of images with humans rendered and corresponding occupancy grids and training data to train a LSTM network. In some implementations, training a scene-specific human detector with the pairs of training images with humans rendered and corresponding training occupancy grids includes providing the pairs of training images with humans rendered and corresponding training occupancy grids to a neural network, where the training images with humans rendered are provided as inputs to the neural network and the corresponding training occupancy grids are provided as target outputs from the neural network.

The process 200 includes generating an occupancy grid for the subsequent image using the human detector (250). For example, the scene-specific human detector 140 may obtain a subsequent image of the scene with three people and generate an occupancy grid that indicates, for each square that corresponds to the three areas in the image that the three people are in, that a human is detected.

In some implementations, generating a sample occupancy grid for a sample image using the scene-specific human detector includes providing the sample image as an input to the scene-specific human detector and obtaining, as the sample occupancy grid for the sample image, an output of the scene-specific human detector in response to the sample image as the input.

The process 200 includes augmenting the subsequent image using the occupancy grid (260). For example, the image augmenter 150 may add a human shaped oval around each area of the subsequent image that corresponds to a square for which the occupancy grid indicates a human was detected. In some implementations, augmenting the sample image using the sample occupancy grid includes providing an oval near portions of the sample image that correspond to the portions of the sample occupancy grid that indicate that a human is present.

The process 200 may include providing the sample image that is augmented for display. For example, the image augmenter 150 may provide the augmented image to a device of a security guard that is monitoring the scene.

In a specific example, the process 200 may include creating a 32×32 occupancy grid map (e.g. 16×16 m² region when a grid is 0.5 m×0.5 m). Each of the squares in the occupancy grid may be encoded by a number between 1 and 1024 (32×32=1024), where the number encoded for each square is unique in the grid. A subsequent image may be encoded as a CNN code through a pre-trained CNN model (e.g. VGG Network). The encoded vector may be fed into a LSTM (Long Short-Term Memory) Network. The output of the LSTM Network may be a sequence of 1024×3 vectors that contain the human occupancy flag, width (fatness), and height of person at each location.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining an image of a scene without people;
generating a reference occupancy grid from the image;
generating pairs of training images with humans rendered and corresponding training occupancy grids based on the reference occupancy grid and the image, wherein generating the pairs of training images and the corresponding training occupancy grids includes, in the image of the scene without people, rendering graphical representations of humans in locations that correspond to particular areas indicated by the training occupancy grids as having humans present;
training a scene-specific human detector with the pairs of training images with humans rendered and corresponding training occupancy grids;
generating a sample occupancy grid from a sample image using the scene-specific human detector; and
augmenting the sample image using the sample occupancy grid.

2. The method of claim 1, wherein generating a reference occupancy grid from the image comprises:
generating an overhead grid representation of the scene in the image, where each square within the overhead grid representation corresponds to a different geographical area in the scene.

3. The method of claim 1, wherein generating a reference occupancy grid from the image comprises:
identifying ground in the image; and
mapping a geometric grid onto the ground identified in the image.

4. The method of claim 1, wherein generating pairs of training images with humans rendered and corresponding training occupancy grids based on the reference occupancy grid and the image comprises:
generating a first training occupancy grid that indicates humans present in particular areas in a first training image; and
generating the first training image by rendering graphical representations of humans in locations in the first training image that correspond to the particular areas indicated by the training occupancy grid as having humans present.

5. The method of claim 1, wherein generating pairs of training images with humans rendered and corresponding training occupancy grids based on the reference occupancy grid and the image comprises:
generating a first training occupancy grid that indicates different types of humans present in particular areas in a first training image; and
generating the first training image by rendering graphical representations of humans in locations in the first training image that correspond to the particular areas indicated by the first training occupancy grid as having humans present, where the graphical representations of humans rendered are visually different based on the type of human indicated by the first training occupancy grid.

6. The method of claim 1, wherein training a scene-specific human detector with the pairs of training images with humans rendered and corresponding training occupancy grids comprises:
providing the pairs of training images with humans rendered and corresponding training occupancy grids to a neural network,
where the training images with humans rendered are provided as inputs to the neural network and the corresponding training occupancy grids are provided as target outputs from the neural network.

7. The method of claim 1, wherein generating a sample occupancy grid for a sample image using the scene-specific human detector comprises:
providing the sample image as an input to the scene-specific human detector; and
obtaining, as the sample occupancy grid for the sample image, an output of the scene-specific human detector in response to the sample image as the input.

8. The method of claim 1, wherein augmenting the sample image using the sample occupancy grid comprises:
providing an oval near portions of the sample image that correspond to the portions of the sample occupancy grid that indicate that a human is present.

9. The method of claim 1, comprising:
providing the sample image that is augmented for display.

10. A system comprising:
one or more computers and one or more storage devices storing instructions that are operable, when executed by the one or more computers, to cause the one or more computers to perform operations comprising:
obtaining an image of a scene without people;
generating a reference occupancy grid from the image;
generating pairs of training images with humans rendered and corresponding training occupancy grids based on the reference occupancy grid and the image, wherein generating the pairs of training images and the corresponding training occupancy grids includes, in the image of the scene without people, rendering graphical representations of humans in locations that correspond to particular areas indicated by the training occupancy grids as having humans present;

training a scene-specific human detector with the pairs of training images with humans rendered and corresponding training occupancy grids;

generating a sample occupancy grid from a sample image using the scene-specific human detector; and augmenting the sample image using the sample occupancy grid.

11. The system of claim 10, wherein generating a reference occupancy grid from the image comprises:

generating an overhead grid representation of the scene in the image, where each square within the overhead grid representation corresponds to a different geographical area in the scene.

12. The system of claim 10, wherein generating a reference occupancy grid from the image comprises:

identifying ground in the image; and mapping a geometric grid onto the ground identified in the image.

13. The system of claim 10, wherein generating pairs of training images with humans rendered and corresponding training occupancy grids based on the reference occupancy grid and the image comprises:

generating a first training occupancy grid that indicates humans present in particular areas in a first training image; and generating the first training image by rendering graphical representations of humans in locations in the first training image that correspond to the particular areas indicated by the training occupancy grid as having humans present.

14. The system of claim 10, wherein generating pairs of training images with humans rendered and corresponding training occupancy grids based on the reference occupancy grid and the image comprises:

generating a first training occupancy grid that indicates different types of humans present in particular areas in a first training image; and generating the first training image by rendering graphical representations of humans in locations in the first training image that correspond to the particular areas indicated by the first training occupancy grid as having humans present, where the graphical representations of humans rendered are visually different based on the type of human indicated by the first training occupancy grid.

15. The system of claim 10, wherein training a scene-specific human detector with the pairs of training images with humans rendered and corresponding training occupancy grids comprises:

providing the pairs of training images with humans rendered and corresponding training occupancy grids to a neural network, where the training images with humans rendered are provided as inputs to the neural network and the corresponding training occupancy grids are provided as target outputs from the neural network.

16. The system of claim 10, wherein generating a sample occupancy grid for a sample image using the scene-specific human detector comprises:

providing the sample image as an input to the scene-specific human detector; and obtaining, as the sample occupancy grid for the sample image, an output of the scene-specific human detector in response to the sample image as the input.

17. The system of claim 10, wherein augmenting the sample image using the sample occupancy grid comprises:

providing an oval near portions of the sample image that correspond to the portions of the sample occupancy grid that indicate that a human is present.

18. The system of claim 10, comprising:

providing the sample image that is augmented for display.

19. A non-transitory computer-readable medium storing software comprising instructions executable by one or more computers which, upon such execution, cause the one or more computers to perform operations comprising:

obtaining an image of a scene without people;

generating a reference occupancy grid from the image;

generating pairs of training images with humans rendered and corresponding training occupancy grids based on the reference occupancy grid and the image, wherein generating the pairs of training images and the corresponding training occupancy grids includes, in the image of the scene without people, rendering graphical representations of humans in locations that correspond to particular areas indicated by the training occupancy grids as having humans present;

training a scene-specific human detector with the pairs of training images with humans rendered and corresponding training occupancy grids;

generating a sample occupancy grid from a sample image using the scene-specific human detector; and augmenting the sample image using the sample occupancy grid.

20. The method of claim 1, wherein generating pairs of training images with humans rendered and corresponding training occupancy grids based on the occupancy grid and the image comprises:

generating the pairs until a respective pair is generated for every different combination of occupancy within the reference occupancy grid.

* * * * *